(12) United States Patent
Shoji (10) Patent No.: US 12,290,991 B2
(45) Date of Patent: May 6, 2025

(54) THERMOPLASTIC RESIN COMPOSITION FOR MILLIMETER-WAVE RADAR MEMBER, MOLDED ARTICLE, AND METHOD FOR PRODUCING RESIN COMPOSITION

(71) Applicant: MITSUBISHI CHEMICAL CORPORATION, Tokyo (JP)

(72) Inventor: Hidekazu Shoji, Hiratsuka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 670 days.

(21) Appl. No.: 17/612,336

(22) PCT Filed: May 15, 2020

(86) PCT No.: PCT/JP2020/019421
§ 371 (c)(1),
(2) Date: Nov. 18, 2021

(87) PCT Pub. No.: WO2020/235472
PCT Pub. Date: Nov. 26, 2020

(65) Prior Publication Data
US 2022/0325037 A1    Oct. 13, 2022

(30) Foreign Application Priority Data

May 20, 2019 (JP) ................. 2019-094719
Apr. 2, 2020 (JP) ................. 2020-066525

(51) Int. Cl.
| | | |
|---|---|---|
| C08L 67/02 | (2006.01) | |
| B29C 48/40 | (2019.01) | |
| B29C 65/16 | (2006.01) | |
| C08F 222/06 | (2006.01) | |
| C08G 59/24 | (2006.01) | |
| C08K 3/04 | (2006.01) | |
| C08K 7/14 | (2006.01) | |
| C08K 9/08 | (2006.01) | |
| C08L 25/08 | (2006.01) | |
| C08L 51/04 | (2006.01) | |
| C08L 69/00 | (2006.01) | |
| G01S 7/02 | (2006.01) | |
| G01S 7/03 | (2006.01) | |
| G01S 13/931 | (2020.01) | |
| H01Q 1/42 | (2006.01) | |

(52) U.S. Cl.
CPC .......... *B29C 65/1635* (2013.01); *B29C 48/40* (2019.02); *C08F 222/06* (2013.01); *C08G 59/245* (2013.01); *C08K 3/04* (2013.01); *C08K 7/14* (2013.01); *C08K 9/08* (2013.01); *C08L 25/08* (2013.01); *C08L 51/04* (2013.01); *C08L 69/00* (2013.01); *G01S 7/027* (2021.05); *G01S 7/03* (2013.01); *G01S 13/931* (2013.01); *H01Q 1/42* (2013.01); *C08K 2201/019* (2013.01); *C08L 2201/10* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 6,239,757 B1 | 5/2001 | Ishikawa et al. | |
| 2004/0227663 A1 | 11/2004 | Suzuki et al. | |
| 2007/0129475 A1 | 6/2007 | Sakata et al. | |
| 2008/0161468 A1 | 7/2008 | Juikar et al. | |
| 2011/0092616 A1 | 4/2011 | Sakata et al. | |
| 2012/0329910 A1* | 12/2012 | Lee | C08L 67/02 523/436 |
| 2014/0093665 A1 | 4/2014 | Horibe et al. | |
| 2015/0368458 A1* | 12/2015 | Sun | C08K 7/14 524/508 |
| 2019/0016883 A1 | 1/2019 | Yamanaka et al. | |

FOREIGN PATENT DOCUMENTS

| | | |
|---|---|---|
| CN | 102056988 A | 5/2011 |
| CN | 103707830 A | 4/2014 |
| CN | 108699322 A | 10/2018 |
| JP | 7-283634 A | 10/1995 |
| JP | 2003-224414 A | 8/2003 |
| JP | 2004-312696 A | 11/2004 |
| JP | 2006111693 * | 4/2006 |
| JP | 2010-189584 A | 9/2010 |
| JP | 2011-127062 A | 6/2011 |
| JP | 2012-119929 A | 6/2012 |
| JP | 2013-43942 A | 3/2013 |
| JP | 2013-131576 A | 7/2013 |
| JP | 2013-155278 A | 8/2013 |
| JP | 2016-121334 A | 7/2016 |
| JP | 2018-159003 A | 10/2018 |
| JP | 2019-44066 A | 3/2019 |
| JP | 2019-106627 A | 6/2019 |
| WO | WO 2005/035657 A1 | 4/2005 |

OTHER PUBLICATIONS

International Search Report mailed on Jul. 21, 2020 in PCT/JP2020/019421 filed on May 15, 2020 (3 pages).

Notice of Reasons for Refusal issued Nov. 7, 2022 in Japanese Patent Application No. 2019-094719 (with English language translation), 9 pages.

Japanese Office Action issued Aug. 22, 2023 in Japanese Application 2020-066525, (with unedited computer-generated English translation), 15 pages.

(Continued)

*Primary Examiner* — David J Buttner
(74) *Attorney, Agent, or Firm* — Oblon, McClelland, Maier & Neustadt, L.L.P.

(57) ABSTRACT

A thermoplastic resin composition for a millimeter-wave radar member may include, relative to 100 parts by mass of a polybutylene terephthalate resin (A), 15 to 65 parts by mass of a rubber-reinforced polystyrene resin (B1) and/or 10 to 70 parts by mass of a polycarbonate resin (B2) as a component (B), 0.1 to 3 parts by mass of an epoxy compound (D), and 30 to 150 parts by mass of glass fiber (E).

20 Claims, 1 Drawing Sheet

(56) References Cited

OTHER PUBLICATIONS

Combined Chinese Office Action and Search Report issued Nov. 30, 2022, in corresponding Chinese Patent Application No. 202080037010.6 (with English Translation of Category of Cited Documents) citing documents 15-17 therein, 9 pages.

Combined Chinese Office Action and Search Report issued Jun. 16, 2023 in Chinese Application No. 202080037010.6, citing reference 15 therein (with English Translation of Category of Cited Documents only), 8 pages.

\* cited by examiner

THERMOPLASTIC RESIN COMPOSITION FOR MILLIMETER-WAVE RADAR MEMBER, MOLDED ARTICLE, AND METHOD FOR PRODUCING RESIN COMPOSITION

CROSS-REFERENCE TO RELATED APPLICATIONS

The present application is the national stage of international application PCT/JP2020/019421, filed on May 27, 2020, and claims the benefit of the filing date of Japanese Appl. No. 2019-094719, filed on May 20, 2019, and Japanese Appl. No. 2020-066525, filed on Apr. 2, 2020.

TECHNICAL FIELD

The present invention relates to a thermoplastic resin composition for millimeter-wave radar member; a molded article; and a method for producing the resin composition, and more specifically relates to a thermoplastic resin composition for millimeter-wave radar member, which has a low relative dielectric constant, yields molded articles having little variation in terms of relative dielectric constant, is excellent in terms of low warpage and external appearance, exhibits excellent strength and rigidity, exhibit high light transmittance, and exhibits excellent laser welding properties; a molded article composed of same; and a method for producing the resin composition.

BACKGROUND ART

Millimeter-wave radar detects the presence of obstacles by transmitting electromagnetic wave in the millimeter-wave band and receiving reflected waves that return after transmitted millimeter-waves impact upon the obstacles, and are less affected by rain, mist, back lighting, and the like, than other methods (by optical laser radar, camera, and the like) for detecting obstacles, and therefore has the characteristic of being potent at night and during bad weather when visibility is poor, and is used in automobile collision prevention sensor, driving support system, automated driving system, road information provision system, and the like.

Antenna units are incorporated inside millimeter-wave radar, and a millimeter-wave radar cover is attached in front of transmitting and receiving antennas in order to protect the antenna surfaces. If the millimeter-wave radar cover does not exhibit sufficient transmission of millimeter-wave, it is not possible to precisely detect obstacle and the like because transmitted millimeter-waves and reflected waves from transmitting and receiving antennas are attenuated and performance required of millimeter-wave radar cannot be achieved. A low relative dielectric constant is required in order to lower millimeter-wave transmission properties.

PTL 1 indicates that a polybutylene terephthalate resin composition of a polybutylene terephthalate resin and a cyclic olefin resin having a glass transition temperature of 100° C. or higher is suitable for use as a radome for millimeter-wave. However, polybutylene terephthalate resin composition containing this type of cyclic olefin resin require further improvements as materials for millimeter-wave radar member in recent years.

In particular, resin materials for millimeter-wave radar member in recent years require an extremely high level of performance not only in terms of excellent dielectric performance, such as a low relative dielectric constant, but also low warping, excellent external appearance, and excellent strength and rigidity. In addition, there is a requirement for the absence of variation in terms of performance of molded articles obtained through molding.

For example, when millimeter-wave radar member is produced in recent years, a millimeter-wave radar cover is brought into direct contact with a housing case formed of a molded resin article and laser welded in many cases, and high laser light transmission properties and excellent laser welding properties are required.

CITATION LIST

Patent Literature

[PTL 1] JP 2013-43942 A

SUMMARY OF INVENTION

Technical Problem

The object of (problem to be addressed by) the present invention is to provide a thermoplastic resin composition for millimeter-wave radar member, which has a low relative dielectric constant, yields molded articles having little variation in terms of relative dielectric constant, are excellent in terms of low warpage and external appearance, exhibit excellent strength and rigidity, exhibit high light transmittance, and exhibit excellent laser welding properties; a molded article composed of same; and a method for producing the thermoplastic resin composition for millimeter-wave radar member.

Solution to Problem

As a result of diligent research carried out in order to solve the problem mentioned above, the inventors of the present invention found that the problem mentioned above can be solved by a thermoplastic resin composition obtained by blending a polybutylene terephthalate resin with a rubber-reinforced polystyrene resin and a polycarbonate resin, or with a polycarbonate resin and further incorporating specific quantities of an epoxy compound and a glass fiber, and thereby completed the present invention.

The present invention relates to the following thermoplastic resin composition for millimeter-wave radar member; a molded article formed of same; and a method for producing the thermoplastic resin composition.

[1] A thermoplastic resin composition for a millimeter-wave radar member, the composition comprising, relative to 100 parts by mass of a polybutylene terephthalate resin (A), 15 to 65 parts by mass of a rubber-reinforced polystyrene resin (B1) and/or 10 to 70 parts by mass of a polycarbonate resin (B2) as a component (B), 0.1 to 3 parts by mass of an epoxy compound (D), and 30 to 150 parts by mass of a glass fiber (E).

[2] The thermoplastic resin composition according to [1] above, wherein the component (B) is a rubber-reinforced polystyrene resin (B1) and 10 to 60 parts by mass of a styrene-maleic anhydride copolymer (C) is contained relative to 100 parts by mass of the polybutylene terephthalate resin (A).

[3] The thermoplastic resin composition according to [1] above, comprising, relative to 100 parts by mass of the polybutylene terephthalate resin (A),
(i) 15 to 65 parts by mass of the rubber-reinforced polystyrene resin (B1) and 10 to 60 parts by mass of the polycarbonate resin (B2), or
(ii) 10 to 70 parts by mass of the polycarbonate resin (B2), as the component (B).

[4] The thermoplastic resin composition according to any one of [1] to [3] above, further comprising 0.0005 to 0.5 parts by mass of a laser light-transmitting dye (F) relative to 100 parts by mass of the polybutylene terephthalate resin (A)

[5] The thermoplastic resin composition according to any one of [1] to [4] above, wherein a carbon black is not contained, or even if it is contained, the content thereof is 0.1 parts by mass or less relative to 100 parts by mass of the polybutylene terephthalate resin (A)

[6] The thermoplastic resin composition according to any one of [1] to [5] above, wherein a sizing agent or a surface treatment agent for the glass fiber (E) is a novolac type epoxy compound.

[7] A molded article obtained by molding the thermoplastic resin composition according to any one of [1] to [6] above.

[8] The molded article according to [7] above, having a relative dielectric constant of 3.50 or less.

[9] The molded article according to [7] or [8] above, wherein a difference between maximum and minimum relative dielectric constant values of at least 10 molded articles is 0.07 or less.

[10] The molded article according to any one of [7] to [9] above, wherein the molded article is a millimeter-wave radar member.

[11] The molded article according to any one of [7] to [10] above, which is used for a transmission-side member at the time of laser welding.

[12] A millimeter-wave radar member obtained by joining the molded article according to any one of [7] to [10] above to a molded resin article, which is a material opposite thereto, by means of laser welding.

[13] A method for producing a thermoplastic resin composition for a millimeter-wave radar member according to any one of [1] to [6] by using a twin screw kneading extruder, the method comprising feeding at least components (A), (B1), (B2) and (C) to the base of the twin screw kneading extruder and side feeding the glass fiber (E) thereto, and kneading under a screw kneading temperature of 200° C. or lower.

Advantageous Effects of Invention

The thermoplastic resin composition for millimeter-wave radar member of the present invention has a low relative dielectric constant, gives molded articles which have little variation in terms of relative dielectric constant, achieve an excellent balance between low relative dielectric constant, low warpage and external appearance, exhibit low warpage and external appearance, exhibit excellent strength and rigidity, have high transmittance and exhibit excellent laser welding properties, and can therefore be advantageously used as millimeter-wave radar member.

In addition, according to the method for producing a thermoplastic resin composition of the present invention, a thermoplastic resin composition for millimeter-wave radar member, which has a low relative dielectric constant and gives molded articles which have little variation in terms of relative dielectric constant, exhibit low warpage and excellent external appearance and exhibit excellent strength and rigidity, can be produced easily and stably.

DESCRIPTION OF EMBODIMENTS

Embodiments of the present invention will now be explained in detail. Explanations given below are based on embodiments and specific examples, but it should be understood that the present invention is not limited to such embodiments or specific examples.

Moreover, in cases where the preposition "to" is used in the present specification in order to express a range that encompasses numerical values or physical property values before and after the "to", the range includes the values before and after the "to".

The thermoplastic resin composition for millimeter-wave radar member of the present invention is characterized by containing, relative to 100 parts by mass of a polybutylene terephthalate resin (A), 15 to 65 parts by mass of a rubber-reinforced polystyrene resin (B1) and/or 10 to 70 parts by mass of a polycarbonate resin (B2) as a component (B), 0.1 to 3 parts by mass of an epoxy compound (D) and 30 to 150 parts by mass of a glass fiber (E).

[(A) Polybutylene Terephthalate Resin]

The thermoplastic resin composition of the present invention contains a polybutylene terephthalate resin (A).

The polybutylene terephthalate resin is a polyester resin having a structure in which terephthalic acid units and 1,4-butane diol units are bonded by ester bonds, and includes, in addition to polybutylene terephthalate resin (homopolymer), polybutylene terephthalate copolymer that contains other copolymer components in addition to terephthalic acid units and 1,4-butane diol units, and mixtures of homopolymer and such copolymer.

The polybutylene terephthalate resin may contain dicarboxylic acid units other than terephthalic acid, and specific examples of these other dicarboxylic acid units include aromatic dicarboxylic acids such as isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, bis(4,4'-carboxyphenyl)methane, anthracene dicarboxylic acid and 4,4'-diphenyl ether dicarboxylic acid; alicyclic dicarboxylic acids such as 1,4-cyclohexanedicarboxylic acid and 4,4'-dicyclohexyldicarboxylic acid; and aliphatic dicarboxylic acids such as adipic acid, sebacic acid, azelaic acid and dimer acids.

In cases where the polybutylene terephthalate resin (A) contains diol units other than 1,4-butane diol, specific examples of these other diol units include aliphatic and alicyclic diols having 2 to 20 carbon atoms and bisphenol derivatives. Specific examples thereof include ethylene glycol, propylene glycol, 1,5-pentane diol, 1,6-hexane diol, neopentyl glycol, decamethylene glycol, cyclohexane dimethanol, 4,4'-dicyclohexylhydroxymethane, 4,4'-dicyclohexylhydroxypropane and ethylene oxide-added diols of bisphenol A. In addition to difunctional monomers such as those mentioned above, it is possible to additionally use a small quantity of a trifunctional monomer, such as trimellitic acid, trimesic acid, pyromellitic acid, pentaerythritol or trimethylolpropane in order to introduce a branched structure, or a monofunctional compound such as a fatty acid in order to adjust molecular weight.

As mentioned above, the polybutylene terephthalate resin is preferably a polybutylene terephthalate homopolymer obtained through polycondensation of terephthalic acid and 1,4-butane diol, but may also be a polybutylene terephthalate copolymer containing one or more dicarboxylic acids other than terephthalic acid as carboxylic acid units and/or one or more diols other than 1,4-butane diol as diol units, and in cases where the polybutylene terephthalate resin is a polybutylene terephthalate resin modified by means of copolymerization, examples of preferred specific copolymers include polyester-ether resins obtained by copolymerizing with polyalkylene glycols, and especially polytetramethylene glycol, dimer acid-copolymerized polybutylene terephthalate resins and isophthalic acid-copolymerized polybutylene terephthalate resin. Of these, use of a polyester-ether resin obtained by copolymerizing with polytetramethylene glycol is preferred.

Moreover, in these copolymers, the copolymerization amount is not less than 1 mol % and less than 50 mol % of all segments in the polybutylene terephthalate resin. Within this range, the copolymerization amount is preferably not less than 2 mol % and less than 50 mol %, more preferably 3 to 40 mol %, and particularly preferably 5 to 20 mol %. Such a copolymerization proportion is preferred from the perspectives of improving fluidity, ductility and tracking resistance.

The amount of terminal carboxyl groups in the polybutylene terephthalate resin should be selected and decided as appropriate, but is generally 60 eq/ton or less, preferably 50 eq/ton or less, and more preferably 30 eq/ton or less. If this amount exceeds 50 eq/ton, alkali resistance and hydrolysis resistance deteriorate, and gas tends to be generated when the resin composition is melt processed. The lower limit for the amount of terminal hydroxyl groups is not particularly limited, but is generally 10 eq/ton in view of productivity when producing the polybutylene terephthalate resin.

Moreover, the amount of terminal carboxyl groups in the polybutylene terephthalate resin is a value measured by dissolving 0.5 g of polybutylene terephthalate resin in 25 mL of benzyl alcohol, and titrating using a 0.01 mol/l benzyl alcohol solution of sodium hydroxide. A method for adjusting the amount of terminal carboxyl groups should be a conventional publicly known method, such as a method comprising adjusting polymerization conditions such as the charging ratios of raw materials when polymerizing, the polymerization temperature or the pressure reduction method, or a method comprising reacting a terminal-blocking agent.

The intrinsic viscosity of the polybutylene terephthalate resin is preferably 0.5 to 2 dl/g. From the perspectives of moldability and mechanical properties, it is more preferable for the intrinsic viscosity to fall within the range 0.6 to 1.5 dl/g. If a resin having an intrinsic viscosity of less than 0.5 dl/g is used, the obtained resin composition tends to have low mechanical strength. In addition, if a resin having an intrinsic viscosity of more than 2 dl/g is used, the fluidity and moldability of the resin composition may deteriorate.

Moreover, the intrinsic viscosity of the polybutylene terephthalate resin is a value measured at 30° C. in a mixed solvent comprising tetrachloroethane and phenol at a mass ratio of 1:1.

The polybutylene terephthalate resin can be produced by subjecting a dicarboxylic acid component containing terephthalic acid as a primary component, or an ester derivative thereof, and a diol component containing 1,4-butane diol as a main component to batch type or continuous melt polymerization. In addition, it is also possible to increase the degree of polymerization (or molecular weight) to a desired value by producing a low molecular weight polybutylene terephthalate resin by means of melt polymerization and then carrying out solid state polymerization in a nitrogen stream or under reduced pressure.

The polybutylene terephthalate resin is preferably obtained using a production method comprising subjecting a dicarboxylic acid component containing terephthalic acid as a main component and a diol component containing 1,4-butane diol as a main component to continuous melt polycondensation.

A catalyst used when carrying out an esterification reaction may be a catalyst that was known in the past, for example a titanium compound, a tin compound, a magnesium compound or a calcium compound. Of these, a titanium compound is particularly preferred. Specific examples of titanium compound used as esterification catalyst include titanium alcoholate, such as tetramethyl titanate, tetraisopropyl titanate and tetrabutyl titanate; and titanium phenolate such as tetraphenyl titanate.

The thermoplastic resin composition of the present invention contains a rubber-reinforced polystyrene resin (B1) and/or a polycarbonate resin (B2) as a component (B).

[(B1) Rubber-Reinforced Polystyrene Resin]

The rubber-reinforced polystyrene resin is obtained by blending a rubbery polymer in polystyrene. Examples of the blending method include (1) a method of mechanically blending both components, (2) a so-called graft copolymerization method in which a styrene monomer or the like is graft copolymerized in the presence of a rubbery polymer, and (3) a so-called graft-blend method in which a commonly used polystyrene produced using a separate method is blended with the graft copolymer in method (2) above. From the perspectives of compatibility and affinity between the polystyrene and the rubbery polymer, a graft copolymer obtained using method (2) or a graft-blended product obtained using method (3) is preferred.

Examples of methods for producing the rubber-reinforced polystyrene resin by means of a graft copolymerization method include methods of graft polymerizing a styrene monomer or the like in the presence of a rubber, such as emulsion polymerization, solution polymerization and suspension polymerization. This type of rubber-modified polystyrene resin is generally known as a high impact polystyrene (HIPS).

Specific examples of the rubbery polymer contained in the rubber-reinforced polystyrene resin include conjugated diene rubber, such as polybutadiene, styrene-butadiene copolymer and hydrogenated styrene-butadiene block copolymer, and non-conjugated diene rubber such as ethylene-propylene copolymer. Of these, polybutadiene is preferred.

Examples of the styrene monomer that constitutes the rubber-reinforced polystyrene resin include styrene, α-methylstyrene, p-methylstyrene and bromostyrene. Of these, styrene and/or α-methylstyrene are most preferred. Examples of monomers other than the styrene monomer include vinyl monomer such as acrylonitrile and methyl methacrylate.

The content of the rubbery polymer component in the rubber-reinforced polystyrene resin is preferably 1 to 50 mass %, more preferably 2 to 40 mass %, and further preferably 3 to 30 mass %. In addition, in cases where a monomer component other than the styrene monomer is contained, the sum of the content of the rubbery polymer component and the styrene monomer component in the rubber-reinforced polystyrene resin is preferably 90 mass % or more, and more preferably 95 mass % or more.

The MFR value, which reflects the molecular weight of the rubber-reinforced polystyrene resin, is preferably 0.5 to 15 g/10 min, and more preferably 1.0 to 10 g/10 min, when measured at a temperature of 200° C. under a load of 5 kg. If the MFR value falls outside this range, compatibility is insufficient when the rubber-reinforced polystyrene resin is melt kneaded with the polybutylene terephthalate, which can lead to a deterioration in physical properties of the product.

The content of the rubber-reinforced polystyrene resin (B1) is 15 to 65 parts by mass, preferably 20 parts by mass or more, more preferably 30 parts by mass or more, and further preferably 40 parts by mass or more, and is preferably 60 parts by mass or less, and more preferably 55 parts by mass or less, relative to 100 parts by mass of the polybutylene terephthalate resin (A). At such a quantity, it is possible to obtain a resin composition which has excellent dielectric properties, low warpage and excellent external appearance, strength and rigidity by blending with prescribed quantities of the epoxy compound (D) and a glass fiber (E).

[(B2) Polycarbonate Resin]

The polycarbonate resin is an optionally branched thermoplastic polymer or copolymer obtained by reacting a dihydroxy compound or a dihydroxy compound and a small quantity of a polyhydroxy compound with phosgene or a carbonic acid diester. The method for producing the polycarbonate resin is not particularly limited, and it is possible to use a conventional publicly known phosgene method (an interfacial polymerization method) or melt process (a transesterification process).

The dihydroxy compound raw material is preferably an aromatic dihydroxy compound that contains substantially no bromine atoms. Specific examples thereof include 2,2-bis (4-hydroxyphenyl)propane (that is, bisphenol A), 1,1-bis(4-hydroxyphenyl)propane, 2,2-bis(3-methyl-4-hydroxyphenyl)propane (that is, bisphenol C), tetramethylbisphenol A, bis(4-hydroxyphenyl)-p-diisopropylbenzene, hydroquinone, resorcinol and 4,4-dihydroxydiphenyl, with bisphenol A and bisphenol C being preferred. In addition, it is possible to use a compound in which one or more tetraalkyl phosphonium sulfonates are bonded to an aromatic dihydroxy compound mentioned above.

Among those mentioned above, the polycarbonate resin is preferably an aromatic polycarbonate resin derived from 2,2-bis(4-hydroxyphenyl)propane or an aromatic polycarbonate copolymer derived from 2,2-bis(4-hydroxyphenyl) propane and another aromatic dihydroxy compound. In addition, the polycarbonate resin may also be a copolymer comprising mainly an aromatic polycarbonate resin, such as a copolymer of an aromatic polycarbonate and a polymer or oligomer having a siloxane structure. Furthermore, it is possible to use a mixture of two or more polycarbonate resins mentioned above.

A monovalent aromatic hydroxy compound should be used in order to adjust the molecular weight of the polycarbonate resin, and examples of such compounds include m- and p-methylphenol, m- and p-propylphenol, p-tert-butylphenol and p-long chain alkyl-substituted phenol compounds.

The viscosity average molecular weight (Mv) of the polycarbonate resin is preferably 15,000 or more, particularly preferably 16,000 or more, and most preferably 20,000 or more. By using a polycarbonate resin having a viscosity average molecular weight of less than 15,000, an obtained resin composition tends to have lower impact resistance. In addition, the My value is preferably 40,000 or less, more preferably 35,000 or less, and further preferably 30,000 or less. If a polycarbonate resin having a viscosity average molecular weight of more than 40,000 is used, the fluidity and moldability of the resin composition may deteriorate.

In the present invention, the viscosity average molecular weight (Mv) of the polycarbonate resin is a value that is obtained by determining the intrinsic viscosity ($[\eta]$) by measuring the viscosity of a methylene chloride solution of the polycarbonate resin at 25° C. using a Ubbelohde type viscometer, and then calculating the viscosity average molecular weight from the Schnell viscosity equation below.

$$[\eta]=1.23\times10^{-4}Mv^{0.83}$$

The method for producing the polycarbonate resin is not particularly limited, and it is possible to use a polycarbonate resin produced using the phosgene method (an interfacial polymerization method) or a melt process (a transesterification method). In addition, a polycarbonate resin obtained by subjecting a polycarbonate resin produced by means of a melt process to a post treatment that adjusts the amount of terminal hydroxyl (OH) groups is also preferred.

A content of the polycarbonate resin (B1) is:
(i) preferably 10 to 60 parts by mass, more preferably 40 parts by mass or less, and further preferably 30 parts by mass or less, and is more preferably 15 parts by mass or more, relative to 100 parts by mass of the polybutylene terephthalate resin (A) when used in combination with the rubber-reinforced polystyrene resin (B), and
(ii) 10 to 70 parts by mass, preferably 20 parts by mass or less, and more preferably 30 parts by mass or less, is more preferably 40 parts by mass or more, and is preferably 65 parts by mass or less and more preferably 55 parts by mass or less, relative to 100 parts by mass of the polybutylene terephthalate resin (A) when not used in combination with the rubber-reinforced polystyrene resin (B).

[(C) Styrene-Maleic Anhydride Copolymer]

The thermoplastic resin composition of the present invention preferably contains a styrene-maleic anhydride copolymer (C).

The styrene-maleic anhydride copolymer is a copolymer of a styrene monomer and a maleic anhydride monomer, and can be produced using a known polymerization method, such as emulsion polymerization, solution polymerization, suspension polymerization or radical polymerization.

The molecular weight and the like of the styrene-maleic anhydride copolymer is not particularly limited, but the weight average molecular weight Mw thereof is preferably 10,000 to 500,000, more preferably 40,000 to 400,000, and further preferably 80,000 to 350,000.

Here, weight average molecular weight Mw is mass average molecular weight in terms of polystyrene, as measured by gel permeation chromatography (GPC) using tetrahydrofuran as a solvent.

In addition, the glass transition temperature Tg of the styrene-maleic anhydride copolymer preferably falls within the range 100 to 165° C.

The content of maleic anhydride in the styrene-maleic anhydride copolymer is preferably selected within the range 1 to 20 mass %. If the amount of maleic anhydride exceeds 20 mass %, there may be excessive reaction with the polybutylene terephthalate resin, which can lead to an increase in viscosity due to crosslinking.

The styrene-maleic anhydride copolymer may be copolymerized with other monomer components as long as properties of the present invention are not impaired, and specific examples of other monomer components include aromatic vinyl monomers such as α-methylstyrene, vinyl cyanide monomers such as acrylonitrile, unsaturated carboxylic acid alkyl ester monomers such as methyl methacrylate and methyl acrylate, and maleimide monomers such as N-methylmaleimide, N-ethylmaleimide, N-cyclohexylmaleimide and N-phenylmaleimide, and it is possible to use one of these other monomer components, or two or more types thereof.

The styrene-maleic anhydride copolymer (C) is preferably a styrene-maleic anhydride copolymer also known as an SMA resin.

The content of the styrene-maleic anhydride copolymer (C) is preferably 10 to 60 parts by mass, more preferably 13 parts by mass or more, and further preferably 15 parts by mass or more, and is more preferably 50 parts by mass or less, and further preferably 40 parts by mass or less, relative to 100 parts by mass of the polybutylene terephthalate resin (A). By being contained at such a quantity, it is possible to obtain a resin composition which has excellent dielectric properties, low warpage and excellent external appearance, strength and rigidity. The styrene-maleic anhydride copolymer (C) is preferably used in cases where component (B) is the rubber-reinforced polystyrene resin (B1) in particular.

[(D) Epoxy Compound]

The thermoplastic resin composition of the present invention contains an epoxy compound (D).

The epoxy compound should have one or more epoxy groups per molecule, and a glycidyl compound that is a product of a reaction between epichlorohydrin and an alcohol, phenol compound or carboxylic acid, or the like, or an epoxy compound obtained by epoxidation of an olefinic double bond, should generally be used.

Examples of the epoxy compound include novolac type epoxy compound, bisphenol A type epoxy compound, bisphenol F type epoxy compound, alicyclic epoxy compound, glycidyl ether compound, glycidyl ester compound, epoxidized butadiene polymer and resorcin type epoxy compound.

Examples of novolac type epoxy compound include phenol novolac type epoxy compound and cresol novolac type epoxy compound.

Examples of bisphenol A type epoxy compound include bisphenol A diglycidyl ether and hydrogenated bisphenol A diglycidyl ether, and examples of bisphenol F type epoxy compound include bisphenol F diglycidyl ether and hydrogenated bisphenol F diglycidyl ether.

Examples of alicyclic epoxy compound include vinylcyclohexene oxide, dicyclopentadiene oxide, 3,4-epoxycyclohexyl-3,4-cyclohexyl carboxylate, bis(3,4-epoxycyclohexylmethyl) adipate, vinylcyclohexene diepoxide and 3,4-epoxycyclohexyl glycidyl ether.

Examples of glycidyl ether compounds include monoglycidyl ether compound such as methyl glycidyl ether, butyl glycidyl ether, 2-ethylhexyl glycidyl ether, decyl glycidyl ether, stearyl glycidyl ether, phenyl glycidyl ether, butylphenyl glycidyl ether and allyl glycidyl ether; and diglycidyl ether compound such as neopentyl glycol diglycidyl ether, ethylene glycol diglycidyl ether, glycerin diglycidyl ether, propylene glycol diglycidyl ether and bisphenol A diglycidyl ether.

Examples of glycidyl ester compound include monoglycidyl ester compound such as glycidyl benzoic acid ester and glycidyl sorbic acid ester; and diglycidyl ester compound such as diglycidyl adipic acid ester, diglycidyl terephthalic acid ester, diglycidyl orthophthalic acid ester.

Examples of epoxidized butadiene polymer include epoxidized polybutadiene, epoxidized styrene-butadiene copolymer and epoxidized hydrogenated styrene-butadiene copolymer.

Examples of resorcin type epoxy compound include resorcin diglycidyl ether.

In addition, the epoxy compound may be a copolymer comprising a glycidyl group-containing compound as one component. Examples thereof include copolymer of glycidyl ester of $\alpha,\beta$-unsaturated acid and one or two or more monomers selected from the group consisting of $\alpha$-olefin, acrylic acid, acrylic acid ester, methacrylic acid and methacrylic acid ester.

An epoxy compound having an epoxy equivalent weight of 50 to 10,000 g/eq and a weight average molecular weight 8,000 or less is preferred as the epoxy compound. If the epoxy equivalent weight is less than 50 g/eq, the viscosity of the resin composition increases because the amount of epoxy groups is too high, but if the epoxy equivalent weight exceeds 10,000 g/eq, the amount of epoxy groups is few, meaning that it tends to be difficult to adequately achieve the effect of improving the alkali resistance and hydrolysis resistance of the thermoplastic resin composition. The epoxy equivalent weight is more preferably 100 to 7,000 g/eq, further preferably 100 to 5,000 g/eq, and most preferably 100 to 3,000 g/eq.

In addition, if the weight average molecular weight exceeds 8,000, compatibility with the polybutylene terephthalate resin decreases and the mechanical strength of a molded article tends to deteriorate. The weight average molecular weight is more preferably 7,000 less, and further preferably 6,000 or less.

A bisphenol A type epoxy compound or novolac type epoxy compound obtained by reacting epichlorohydrin with bisphenol A or novolac is particularly preferred as the epoxy compound from the perspectives of hydrolysis resistance and surface appearance of a molded article.

Relative to 100 parts by mass of the polybutylene terephthalate resin (A), the content of the epoxy compound (D) is 0.1 to 3 parts by mass, preferably 0.2 parts by mass or more, more preferably 0.3 parts by mass or more, and further preferably 0.35 parts by mass or more. In addition, the content of the epoxy compound (D) is preferably 2.5 parts by mass or less, more preferably 2 parts by mass or less, further preferably 1.5 parts by mass or less, and particularly preferably 1 part by mass or less. By incorporating the epoxy compound at such a quantity, it is possible to lower the molecular weight and mechanical strength and the like through hydrolysis of the polybutylene terephthalate, and by blending prescribed quantities of the rubber-reinforced polystyrene resin (B1), the polycarbonate resin (B2) and the glass fiber (E), it is possible to obtain a resin composition which exhibits excellent dielectric properties, low warpage, and excellent external appearance, strength and rigidity. Alkali resistance and hydrolysis resistance tend to deteriorate if the content of the epoxy compound is less than 0.1 parts by mass, and crosslinking tends to progress and flowability during molding tends to deteriorate if the content of the epoxy compound exceeds 3 parts by mass.

Furthermore, the equivalence ratio of epoxy groups in the epoxy compound (D) relative to terminal COOH groups in the polybutylene terephthalate resin (A) (epoxy groups/COOH groups) preferably falls within the range 0.2 to 2.7. Hydrolysis resistance tends to deteriorate if this equivalence ratio is lower than 0.2, and molding properties tend to become unstable if this equivalence ratio exceeds 2.7. The epoxy group/COOH group ratio is more preferably 0.3 to 2.5.

[(E) Glass Fiber]

The polycarbonate resin composition of the present invention contains a glass fiber (E).

If a glass fiber commonly used in thermoplastic polyester resins is used as the glass fiber, it is possible to use A-glass, E-glass, a zirconia component-containing alkali-resistant glass composition, or the like, but an alkali-free glass (an E-glass) is preferred from the perspective of improving the thermal stability of the resin composition.

In addition, regardless of the form of glass fiber at the time of blending, such as chopped strand, roving glass or a master batch of a thermoplastic resin and glass fiber, it is possible to use any type of well-known glass fiber, but it is generally preferable to use a product obtained by bundling a large number of these fibers as chopped strand glass fiber (chopped glass fiber) cut to a prescribed length.

The average fiber diameter of the glass fiber is preferably 3 to 20 μm, more preferably 5 μm or more, and further preferably 7 μm or more, and is more preferably 18 μm or less, and further preferably 15 μm or less. In addition, the fiber length is preferably 0.3 to 10 mm, more preferably 0.5 mm or more, and further preferably 1 mm or more, and is more preferably 8 mm or less, and further preferably 5 mm or less.

The glass fiber may be treated with a sizing agent or a surface treatment agent. In addition to untreated glass fiber, it is possible to surface treat glass fiber through addition of a sizing agent or a surface treatment agent when producing the resin composition of the present invention.

Examples of sizing agent and surface treatment agent include emulsions of resin such as vinyl acetate resin, ethylene/vinyl acetate copolymer, acrylic resin, epoxy resin, polyurethane resin and polyester resin.

Other examples include epoxy resin such as novolac type epoxy resin, epoxy compound such as bisphenol A type epoxy resin, aminosilane compound such as γ-aminopropyltriethoxysilane, γ-aminopropyltrimethoxysilane and γ-(2-aminoethyl)aminopropyltrimethoxysilane, chlorosilane compound such as vinyltrichlorosilane and methylvinyldichlorosilane, alkoxysilane compound such as vinyltrimethoxysilane, vinyltriethoxysilane, vinyltriacetoxysilane and γ-ethacryloxypropyltrimethoxysilane, epoxysilane compound such as β-(3,4-epoxycyclohexyl)ethyltrimethoxysilane and γ-glycidoxypropyltrimethoxysilane, acrylic compound, isocyanate compound and titanate compound.

Among these sizing agents and surface treatment agents, novolac type epoxy resin and bisphenol A type epoxy resin are preferred, and novolac type epoxy resin is particularly preferred.

It is possible to use a combination of two or more of these sizing agents and surface treatment agents, and the usage quantity (coating weight) thereof is generally 10 mass % or less, and preferably 0.05 to 5 mass %, relative to the mass % of the glass fiber. Setting this coating weight to be 10 mass % or less achieves a necessary and satisfactory effect, and is therefore economically advantageous.

Two or more types of glass fiber may be used in combination according to required properties.

The content of the glass fiber (E) is 30 to 150 parts by mass, preferably 40 parts by mass or more, and more preferably 50 parts by mass or more, and is preferably 120 parts by mass or less, and more preferably 100 parts by mass or less, relative to 100 parts by mass of the polybutylene terephthalate resin (A). By incorporating glass fiber at such a quantity, it is possible to improve the strength and heat resistance of an obtained molded article and enhance the advantageous effect of reducing shrinkage, and if this content exceeds 150 parts by mass, impact resistance and fluidity are insufficient, the surface appearance of a molded article tends to deteriorate, and stable production is difficult. If this content is less than 30 parts by mass, the advantageous effect of improving strength, rigidity, and the like, decreases. However, in cases where the added quantity of the glass fiber is less than 30 parts by mass, if the dielectric constant, appearance and weld strength are good as a result of product design and usage environment, there may be some applications and usage examples in which such use is possible. In cases corresponding to such examples, the content of the glass fiber is preferably 25 parts by weight or more.

[Other Inorganic Filler]

The thermoplastic resin composition of the present invention preferably contains other lamellar, granular or amorphous inorganic filler in addition to the glass fiber mentioned above. Lamellar inorganic filler exhibit the function of reducing anisotropy and warping, and examples thereof include talc, glass flake, mica, kaolin and metal foil. Glass flake is preferred among these lamellar inorganic filler.

Examples of other types of granular and amorphous inorganic filler include ceramic beads, clay, zeolite, barium sulfate, titanium oxide, silicon oxide, aluminum oxide, magnesium hydroxide and zinc sulfide.

Talc, titanium oxide and zinc sulfide in particular are preferred as other inorganic filler.

In cases where another inorganic filler is contained, the content thereof is preferably 0.1 to 30 parts by mass, more preferably 0.5 parts by mass or more, and further preferably 1 part by mass or more, and is more preferably 20 parts by mass or less, relative to 100 parts by mass of the polybutylene terephthalate resin (A).

[Laser Light Absorber]

A molded article formed from the thermoplastic resin composition of the present invention is preferably subjected to laser welding with a mating material.

The laser welding method is not particularly limited, and an ordinary method can be used. For example, it is preferable to obtain a single article, by using an obtained molded member for welding as the absorption side (an absorption-side member), bringing the absorption-side member into contact with a molded resin member that is a mating material (a transmission-side member), and irradiating laser light so as to weld and integrate the two molded bodies. It is possible to obtain a single article by bringing a part to be welded of a molded member for welding on the absorption side (an absorption-side member), which has been obtained through injection molding, into surface contact or abutting contact with a transmission-side member, which transmits laser light, and irradiating with laser light, generally from the side of the transmission-side member, which exhibits high transmittance, thereby at least partially melting the interface between the two members and then integrating the two members by cooling.

The absorption-side member containing the laser light absorber is a member comprising a thermoplastic resin composition which can absorb laser light and melt as a result of absorbing laser light, and specific examples thereof include member comprising a thermoplastic resin containing an absorber such as carbon black or a laser light-absorbing dye in order to enable absorption of laser light.

The content of the absorber such as carbon black is not particularly limited, but is preferably, for example, 0.2 to 1 mass % relative to the resin composition.

Preferred examples of laser light-transmitting dyes able to be used in the transmission-side member include nigrosine, aniline black, phthalocyanine, naphthalocyanine, porphyrin, perylene, quaterrylene, azo dye, anthraquinone, squaric acid derivative and immonium compound The content of the laser light-transmitting dye is preferably 0.001 to 5 parts by mass, more preferably 0.003 to 3 parts by mass, and further preferably 0.005 to 2 parts by mass, relative to 100 parts by mass of a resin component.

In order to achieve a higher weld strength, it is preferable for both the absorption-side member and the transmission-side member to be the polybutylene terephthalate resin composition of the present invention, with the absorption-side member containing an absorber such as carbon black or a laser light-absorbing dye and the transmission-side member containing no coloring material or containing a coloring material that transmits laser light.

The absorption-side member and the transmission-side member are not limited to being the same resin composition, and as long as weld strength and air tightness are satisfactory, it is possible to use a resin composition that is different from the resin composition of the present invention in the transmission-side member from perspectives such as appearance and low warpage.

[Stabilizer]

It is preferable for the thermoplastic resin composition of the present invention to contain a stabilizer from the perspectives of improving thermal stability and preventing a deterioration in mechanical strength, transparency and hue. Phosphorus-containing stabilizer, sulfur-containing stabilizer and phenolic stabilizer are preferred as the stabilizer.

Examples of phosphorus-containing stabilizer includes phosphorus acid, phosphoric acid, phosphorus acid ester (phosphite), trivalent phosphoric acid ester (phosphonite) and pentavalent phosphoric acid ester (phosphate), and of these, organic phosphite, organic phosphonite and organic phosphate are preferred.

A preferred organic phosphate compound is a compound represented by the general formula below:

$$(R^1O)_{3-n}P(=O)OH_n$$

(In the formula, $R^1$ denotes an alkyl group or an aryl group, and $R^1$ groups may be the same as, or different from, each other. n denotes an integer of 0 to 2.)

A more preferred organic phosphate compound is a long chain alkyl acid phosphate compound in which $R^1$ has 8 to 30 carbon atoms. Specific examples of alkyl group having 8 to 30 carbon atoms include octyl group, 2-ethylhexyl group, isooctyl group, nonyl group, isononyl group, decyl group, isodecyl group, dodecyl group, tridecyl group, isotridecyl group, tetradecyl group, hexadecyl group, octadecyl group, eicosyl group and triacontyl group.

Examples of long chain alkyl acid phosphates include octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphates, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate and bis (nonylphenyl) acid phosphate. Of these, octadecyl acid phosphate is preferred, and this compound is commercially available as the product "Adekastab AX-71" produced by ADEKA.

A preferred organic phosphite compound is a compound represented by the general formula below:

$$R^2O-P(OR^3)(OR^4)$$

(In the formula, $R^2$, $R^3$ and $R^4$ are each a hydrogen atom, an alkyl group having 1 to 30 carbon atoms or an aryl group having 6 to 30 carbon atoms, and at least one of $R^2$, $R^3$ and $R^4$ is an aryl group having 6 to 30 carbon atoms.)

Examples of organic phosphite compound includes triphenyl phosphite, tris(nonylphenyl) phosphite, dilauryl hydrogen phosphite, triethyl phosphite, tridecyl phosphite, tris(2-ethylhexyl) phosphite, tris(tridecyl) phosphite, tristearyl phosphite, diphenylmonodecyl phosphite, monophenyldidecyl phosphite, diphenylmono(tridecyl) phosphite, tetraphenyldipropylene glycol diphosphite, tetraphenyltetra(tridecyl)pentaerythritol tetraphosphite, hydrogenated bisphenol A phenyl phosphite polymer, diphenyl hydrogen phosphite, 4,4'-butylidene-bis(3-methyl-6-tert-butylphenyldi(tridecyl) phosphite), tetra(tridecyl)4,4'-isopropylidene diphenyl diphosphite, bis(tridecyl)pentaerythritol diphosphite, bis(nonylphenyl)pentaerythritol diphosphite, dilaurylpentaerythritol diphosphite, distearylpentaerythritol diphosphite, tris(4-tert-butylphenyl) phosphite, tris(2,4-di-tert-butylphenyl) phosphite, hydrogenated bisphenol A pentaerythritol phosphite polymer, bis(2,4-di-tert-butylphenyl)pentaerythritol diphosphite, bis(2,6-di-tert-butyl-4-methylphenyl)pentaerythritol diphosphite, 2,2'-methylene-bis(4,6-di-tert-butylphenyl)octyl phosphite and bis(2,4-dicumylphenyl)pentaerythritol diphosphite. Of these, bis(2,6-di-tert-butyl-4-methylphenyl)pentaerythritol diphosphite is preferred.

A preferred organic phosphonite compound is a compound represented by the general formula below:

$$R^5-P(OR^6)(OR^7)$$

(In the formula, $R^5$, $R^6$ and $R^7$ are each a hydrogen atom, an alkyl group having 1 to 30 carbon atoms or an aryl group having 6 to 30 carbon atoms, and at least one of $R^5$, $R^6$ and $R^7$ is an aryl group having 6 to 30 carbon atoms.)

In addition, examples of organic phosphonite compounds include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite.

Any conventional well-known sulfur atom-containing compound can be used as the sulfur-containing stabilizer, and of these, a thioether compound is preferred. Specific examples thereof include didodecyl thiodipropionate, ditetradecyl thiodipropionate, dioctadecyl thiodipropionate, pentaerythritol tetrakis(3-dodecyl thiopropionate), thiobis(N-phenyl-β-naphthylamine), 2-mercaptobenzotriazole, 2-mercaptobenzimidazole, tetramethyl thiuram monosulfide, tetramethyl thiuram disulfide, nickel dibutyl dithiocarbamate, nickel isopropyl xanthate and trilauryl trithiophosphate. Of these, pentaerythritol tetrakis(3-dodecyl thiopropionate) is preferred A preferred example of the phenol-containing stabilizer is a hindered phenol stabilizer, examples of which include pentaerythritol tetrakis(3-(3,5-di-t-butyl-4-hydroxyphenyl)

propionate), octadecyl-3-(3,5-di-tert-butyl-4-hydroxyphenyl)propionate, thiodiethylene bis(3-(3,5-di-tert-butyl-4-hydroxyphenyl)propionate), and pentaerythritol tetrakis(3-(3,5-di-neopentyl-4-hydroxyphenyl)propionate). Of these, pentaerythritol tetrakis(3-(3,5-di-tert-butyl-4-hydroxyphenyl)propionate) and octadecyl-3-(3,5-di-tert-butyl-4-hydroxyphenyl)propionate are preferred.

Specific examples of this type of hindered phenol stabilizer include the products "Irganox 1010" and "Irganox 1076" produced by BASF and the products "Adekastab AO-50" and "Adekastab AO-60" produced by ADEKA.

It is possible to incorporate one stabilizer or an arbitrary combination of two or more types thereof combined at arbitrary proportions.

In the present invention, use of a combination of a phosphorus-containing stabilizer represented by general formula (1) above, and especially a long chain alkyl acid phosphate, and a hindered phenol stabilizer is preferable from the perspectives of retention properties, heat resistance, laser light transmission properties and laser welding properties.

The content of the stabilizer is preferably 0.001 to 2 parts by mass relative to 100 parts by mass of the polybutylene terephthalate resin (A). If the content of the stabilizer is less than 0.001 parts by mass, an improvement in the thermal stability and compatibility of the resin composition can hardly be expected and a decrease in molecular weight and a deterioration in color tone readily occur when the composition is molded, and if the content of the stabilizer exceeds 2 parts by mass, the quantity thereof becomes excessive, silvering occurs, and a deterioration in color tone readily occurs. The content of the stabilizer is more preferably 0.01 to 1.5 parts by mass, and further preferably 0.1 to 1 parts by mass.

[Mold-Release Agent]

The thermoplastic resin composition of the present invention preferably contains a mold-release agent. Known mold-release agents that are commonly used for polyester resins may be used as the mold-release agent, but of these, it is preferable to use a polyolefin compound or a fatty acid ester compound from the perspective of achieving good alkali resistance.

Examples of polyolefin compound include compound selected from among paraffin waxe and polyethylene waxe, and of these, compounds having weight average molecular weights of 700 to 10,000, and especially 900 to 8,000, are preferred.

Examples of fatty acid ester compound include fatty acid ester, such as ester of saturated or unsaturated monovalent or divalent aliphatic carboxylic acid, glycerin fatty acid ester and sorbitan fatty acid ester, and partially saponified products thereof. Of these, mono- and di-fatty acid ester constituted from fatty acid and alcohol having 11 to 28 carbon atoms, and preferably 17 to 21 carbon atoms, are preferred.

Examples of fatty acid include palmitic acid, stearic acid, caproic acid, capric acid, lauric acid, arachic acid, behenic acid, lignoceric acid, cerotic acid, melissic acid, tetratriacontanoic acid, montanic acid, adipic acid and azelaic acid. In addition, fatty acids may be alicyclic.

Saturated and unsaturated monohydric and polyhydric alcohol can be used as the alcohol. These alcohols may have substituent group such as fluorine atom or aryl group. Of these, monohydric and polyhydric saturated alcohol having 30 or fewer carbon atoms are preferred, and aliphatic saturated monohydric and polyhydric alcohol having 30 or fewer carbon atoms are more preferred. Here, aliphatic compound also includes alicyclic compound.

Specific examples of such alcohol include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, di(trimethylolpropane) and dipentaerythritol.

Moreover, the ester compound mentioned above may contain aliphatic carboxylic acid and/or alcohol as impurities, and may be a mixture of a plurality of compounds.

Specific examples of the fatty acid ester compound include glycerol monostearate, glycerol monobehenate, glycerol dibehenate, glycerol-12-hydroxymonostearate, sorbitan monobehenate, pentaerythritol monostearate, pentaerythritol distearate, stearyl stearate and ethylene glycol montanic acid ester.

The content of the mold-release agent is preferably 0.1 to 3 parts by mass, more preferably 0.2 to 2.5 parts by mass, and further preferably 0.3 to 2 parts by mass, relative to 100 parts by mass of the polybutylene terephthalate resin (A). If this content is less than 0.1 parts by mass, surface properties tend to deteriorate as a result of release defects during melt processing, but if this content exceeds 3 parts by mass, the kneading workability of the resin composition tends to deteriorate and the surface of a molded article tends to be cloudy.

[Carbon Black]

The thermoplastic resin composition of the present invention preferably contains carbon black.

The carbon black is not limited in terms of type, raw material or production method, and it is possible to use furnace black, channel black, acetylene black, ketjen black, or the like. The number average particle diameter of the carbon black is not particularly limited, but is preferably approximately 5 to 60 nm.

The carbon black is preferably blended with a thermoplastic resin, and preferably a polybutylene terephthalate resin, and particularly preferably as a master batch mixed with a polybutylene terephthalate resin in advance.

The content of carbon black is preferably 0.1 to 4 parts by mass, and more preferably 0.2 to 3 parts by mass, relative to 100 parts by mass of the polybutylene terephthalate resin (A). If this content is less than 0.1 parts by mass, the desired color cannot be achieved and a weathering resistance improvement effect may not be sufficient, and if this content exceeds 4 parts by mass, mechanical properties tend to deteriorate.

[Other Contained Components]

In addition to components (A) to (C) mentioned above, the thermoplastic resin composition of the present invention can contain other thermoplastic resin as long as the advantageous effect of the present invention is not impaired. Specific examples of other thermoplastic resin include polyethylene terephthalate resin, polyacetal resin, polyamide resin, polyphenylene oxide resin, polyphenylene sulfide resin, polysulfone resin, polyethersulfone resin, polyetherimide resin, polyether ketone resin and polyolefin resin.

However, in cases where other type of resin is contained, the content of it is preferably 20 parts by mass or less, more preferably 10 parts by mass or less, further preferably 5 parts by mass or less, and particularly preferably 3 parts by mass or less, relative to 100 parts by mass of the polybutylene terephthalate resin (A).

In addition, the thermoplastic resin composition of the present invention may contain a variety of additives in addition to those mentioned above, and examples of such additives include flame retardant, auxiliary flame retardant, anti-dripping agent, ultraviolet absorber, anti-static agent, anti-fogging agent, anti-blocking agent, plasticizer, dispersing agent, antimicrobial agent, and coloring agent, dye and pigment other than carbon black.

[Production of Thermoplastic Resin Composition]

The thermoplastic resin composition of the present invention is produced by feeding the essential components mentioned above and other components that are used when necessary to an extruder, melt kneading to obtain a kneaded product, and extruding the kneaded product. Is preferable to extrude the kneaded product to form a pellet-like resin composition.

The method below can be given as an example of a particularly preferred method for producing the thermoplastic resin composition of the present invention.

That is, a method for producing the thermoplastic resin composition by using a twin screw kneading extruder as an extruder, feeding at least the polybutylene terephthalate resin (A), the rubber-reinforced polystyrene resin (B1), the polycarbonate resin (B2) and the styrene-maleic anhydride copolymer (C) to the base (main feed port) of the twin screw kneading extruder, side feeding the glass fiber (E), and kneading at a screw kneading temperature of 200° C. or lower.

The twin screw kneading extruder has a cylinder and two screws inside the cylinder, and the cylinder has the main feed port and a side feed port disposed further downstream from the main feed port in the direction of extrusion. The cylinder is preferably provided with vents at one or more locations.

Resin components (A) to (C) are fed from the main feed port that is the base of the extruder, and the glass fiber (E) are fed from the side feed port of the extruder. The epoxy compound (D) may be fed from the main feed port, but may also be fed from the side feed port that feeds the glass fiber or a separately provided side feed port.

The resin components fed from the main feed port are plasticized in a first kneading part, and the glass fiber (E) are screw-kneaded with the plasticized resin components, but the temperature during this screw-kneading is a lower temperature than routinely used conditions, such as 200° C. or lower. By setting the temperature to be 200° C. or lower when screw-kneading the glass fiber, it is possible to maintain the melt viscosity of component (B) and component (C), which have low melting points (or Tg values), at a higher melt viscosity than normal, increase the shearing force for opening the glass fiber, enable sufficient opening of the glass fiber and homogeneously disperse the glass fiber in the resin composition. Unopened glass fiber that has aggregated while being insufficiently opened, has a high dielectric constant, which leads to an increase in dielectric constant variation in molded articles in which these unopened glass fiber remains and is not homogeneously dispersed, meaning that the rigidity of the molded articles tends to be insufficient, and performance required of a millimeter-wave radar member cannot be stably achieved.

The temperature when screw-kneading the glass fiber is preferably 280° C. or lower, more preferably 195° C. or lower, and further preferably 190° C. or lower, and is preferably 170° C. or higher, more preferably 175° C. or higher, and further preferably 180° C. or higher.

[Molded Article]

The method for producing a molded article using the obtained thermoplastic resin composition is not particularly limited, and can be any molding method commonly used for thermoplastic resin compositions. Examples thereof include injection molding method, ultra-high-speed injection molding method, injection compression molding method, two-color molding method, blow molding method such as gas-assisted method, molding method that use heat insulating mold, molding method that uses rapidly heated mold, foaming molding method (including supercritical fluid), insert molding method, IMC (in-mold coating) molding method, extrusion molding method, sheet molding method, thermoforming method, rotational molding method, lamination molding method, press molding method and blow molding method. Among these, injection molding method are preferred from the perspectives of productivity and the advantageous effect of the present invention, such as good surface properties of an obtained molded article, being excellent.

The relative dielectric constant of a molded article of the thermoplastic resin composition of the present invention is preferably 3.50 or less, more preferably 3.45 or less, further preferably 3.40 or less, and particularly preferably 3.35 or less. In addition, the dielectric loss tangent of a molded article is preferably 0.013 or less. The relative dielectric constant and dielectric loss tangent are numerical values at a frequency of 70 to 90 GHz. Here, the molded article preferably has a thickness of 1 to 5 mm, and the relative dielectric constant and/or dielectric loss tangent values are preferably the values mentioned above within this thickness range.

In addition, molded products obtained by molding the thermoplastic resin composition of the present invention have little variation in terms of relative dielectric constant, and the difference between the maximum and minimum for relative dielectric constant values of at least 10 molded articles is preferably 0.07 or less, and particularly preferably 0.05 or less.

A molded article obtained from the resin composition of the present invention preferably has a relative dielectric constant of 3.50 or less, and particularly preferably 3.45 or less, at a frequency of 70 to 90 GHz. In addition, the dielectric loss tangent of the molded article at a frequency of 70 to 90 GHz is preferably 0.013 or less, and particularly preferably 0.012 or less.

Obtained molded articles have a low relative dielectric constant, have little variation in terms of relative dielectric constant between obtained molded articles, exhibit low warpage and excellent external appearance, exhibit excellent strength and rigidity, and exhibit high transmittance and excellent laser welding properties, and a molded article obtained by laser welding to a molded resin article that is a mating material exhibits excellent weld strength, and can therefore be advantageously used as a milliliter-wave radar member. A millimeter-wave radar member encompasses a housing for housing or protecting an antenna module for transmitting or receiving millimeter-wave, an antenna cover (a radome), and a member disposed in a pathway from a millimeter-wave radar module that includes these to an object to be detected by millimeter-wave (in cases where a millimeter-wave radar member is used in a motor vehicle sensor, this includes a cover, a motor vehicle exterior member, an emblem, or the like, disposed in a pathway of millimeter-wave transmitted or received from a millimeter-wave radar module).

A millimeter-wave radar member can be obtained by irradiating a molded member formed from the thermoplastic resin composition of the present invention and a molded resin article that is a mating material, which is brought into surface contact or abutting contact with the molded member, with laser light, with the molded member preferably disposed as the transmission-side member, so as to at least partially melt the interface between these two members, and then cooling so as to weld and integrate the two members.

From the perspectives of readily achieving laser welding properties and high weld strength, the molded resin article that is a mating member is preferably a molded article comprising a polybutylene terephthalate resin composition, and particularly preferably a molded article obtained by molding the thermoplastic resin composition of the present invention.

Specific preferred examples of millimeter-wave radar include vehicle-mounted millimeter-wave radar used in automatic braking control equipment, inter-vehicular distance control equipment, pedestrian accident reduction steering equipment, false alarm prevention control equipment, equipment for preventing acceleration through erroneous pedal application, approaching vehicle alert notification equipment, lane keeping assist equipment, alarm systems for preventing rear end collisions, parking assistance equipment and surrounding obstacle warning equipment; millimeter-wave radar for railways/aircraft, which is used in platform surveillance/railroad crossing obstacle detection equipment, in-train content transmission equipment, tram/train collision prevention equipment and runway obstacle detection equipment; millimeter-wave radar for transport infrastructure, such as intersection monitoring equipment and elevator monitoring equipment; millimeter-wave radar for security equipment; millimeter-wave radar for medical/care applications, such as systems for protecting children and the elderly; and millimeter-wave radar for transmitting information content.

EXAMPLES

The present invention will now be explained in greater detail through the use of examples. However, it should be understood that the present invention is not limited to the examples given below.

Components used in the examples and comparative examples below are as shown in Table 1 and Table 3 below.

Examples 1 to 3 and Comparative Example 1

Pellets of a thermoplastic resin composition were obtained by homogeneously mixing components other than glass fiber shown in Table 1 above at proportions (parts by mass) shown in Table 2 below using a tumbler mixer, feeding the obtained mixture from the main feed port of a twin screw kneading extruder (TEX30α produced by Japan Steel Works, L/D=42), setting the barrel temperature of a first kneading part to be 270° C., plasticizing, feeding glass fiber at the proportion shown in Table 2 from a side feeder, setting the barrel temperature to be 270° C. following addition of the glass fiber, melt kneading at a discharge rate of 40 kg/h and a screw rotation speed of 200 rpm, extruding the obtained kneaded product, rapidly cooling in a water bath and then forming pellets using a pelletizer. Other than in Example 2, kneading was carried out under the conditions described above and the screw kneading temperature was 278° C.

In Example 2, the barrel temperature was set to be 180° C. following the addition of the glass fiber, but kneading was carried out in the same way as in Example 1 other than this barrel temperature alteration, and the kneading temperature was 186° C.

[Tensile Breaking Strength and Tensile Modulus]

After drying the thus obtained pellets for 5 hours at 120° C., ISO multipurpose test pieces (having thicknesses of 4 mm) were injection molded using an injection molding machine produced by Japan Steel Works (mold clamping force 85 T) at a cylinder temperature of 250° C. and a mold temperature of 80° C.

Tensile breaking strength (units: MPa) and tensile modulus (units: MPa) were measured in accordance with ISO 527 using the ISO multipurpose test piece (thickness 4 mm) mentioned above.

[Hydrolysis Resistance: Tensile Strength Retention Rate after 100 Hours Processing]

The obtained pellets were dried for 5 hours at a temperature of 120° C. using a hot air current dryer and then injection molded into ISO multipurpose test pieces (thick-

TABLE 1

| Component | Code | |
|---|---|---|
| (A) PBT resin | A | Novaduran 5008 produced by Mitsubishi Engineering-Plastics Corporation<br>Intrinsic viscosity: 0.85 dl/g<br>Terminal carboxyl group content: 12 eq/ton |
| (B1) HIPS | B1 | HT478 produced by PS Japan<br>MFR (200° C./5 kg load): 3.0 g/10 min |
| (C) Styrene-maleic anhydride copolymer | C | XIRAN SZ08250 produced by POLYSCOPE<br>Weight average molecular weight: 250,000<br>Tg: 116° C. |
| (D) Epoxy compound | D | EP17 produced by ADEKA<br>Bisphenol A type epoxy resin<br>Epoxy equivalent weight: approximately 185 g/eq |
| (E) Glass fiber | E1 | T-127 produced by Nippon Electric Glass Co.,<br>Chopped strand glass fibers with average fiber diameter of 13 μm<br>Treated with novolac type epoxy resin |
| | E2 | T-187 produced by Nippon Electric Glass Co.<br>Chopped strand glass fibers with average fiber diameter of 13 μm<br>Treated with bisphenol A type epoxy resin |
| Stabilizer | G1 | Pentaerythritol tetrakis[3-(3,5-di-tert-butyl-4-hydroyphenyl)propionate]<br>Irganox 1010 produced by BASF |
| Mold-release agent | H | Pentaerythritol distearate<br>Unistar H-476D produced by NOF Corp.<br>Melting point: 53° C. |
| Carton black MB | J | Master batch obtained by pre-compounding 80% of Novaduran 5008 and 20% of Carbon Black #650 produced by Mitsubishi Chemical Corporation | ness 4 mm) using an injection molding machine ("NEX80" produced by Nissei Plastic Industrial Co.) at a cylinder temperature of 250° C. and a die temperature of 80° C.

Using the ISO multipurpose test pieces, tensile strength (before processing) (units: MPa) was measured in accordance with ISO 527 at a pulling speed of 5 mm/min.

In addition, the ISO multipurpose test pieces were processed for 100 hours using a pressure cooker tester (PCT) (produced by Hirayama Manufacturing Corporation) at a temperature of 121° C., a relative humidity of 100% and a pressure of 2 atm, and then measured in terms of tensile strength in the same way, the strength retention rate (units: %) was calculated as strength following processing relative to strength before processing, and hydrolysis resistance was evaluated.

[Assessment of Warpage Amount and Low Warping Properties]

A circular disk having a diameter of 100 mm and a thickness of 1.6 mm was molded using a side gate mold in an injection molding machine (NEX80-9E produced by Nissei Plastic Industrial Co.) at a cylinder temperature of 260° C. and a mold temperature of 80° C., and the warpage amount (units: mm) of the circular disk was determined.

Low warping properties were evaluated and assessed using the following criteria.
  A: warpage amount less than 1 mm
  B: warpage amount at least 1 mm but less than 3 mm
  C: warpage amount at least 3 mm

[Evaluation of Surface Appearance]

Using an NEX80-9E injection molding machine by Nissei Plastic Industrial Co., a flat plate having a length of 100 mm, a width of 100 mm and a thickness of 3 mm was molded at a cylinder temperature of 250° C. and a mold temperature of 80° C., and the surface appearance of the flat plate was observed by eye and classified as follows.
  A: good
  B: slightly poor
  C: extremely poor

[Relative Dielectric Constant and Dielectric Loss Tangent]

Ten plate-like molded articles each having a length of 100 mm, a width of 100 mm and a thickness of approximately 2 mm were obtained by drying the pellets obtained using the method mentioned above for 5 hours at 120° C. and then injection molding using an NEX80-9E injection molding machine by Nissei Plastic Industrial Co., at a cylinder temperature of 250° C. and a mold temperature of 80° C.

A molded article obtained in this way was placed on a sample stand having a diameter Φ of 80 mm, and the amount of transmission attenuation and the amount of phase change were measured using WR10-VNAX millimeter-wave module by Virginia Diodes and a DPS10 millimeter-wave/microwave measurement apparatus system equipped with N5227A network analyzer by KEYSIGHT and a dielectric lens-equipped transmission attenuation measurement tool by Keycom Corporation, using a free space frequency change method at a measurement frequency of 70 to 90 GHz at 25° C. In addition, the precise thickness of the molded article was measured using a digital micrometer by Shinwa Rules Co., and the relative dielectric constant and dielectric loss tangent were determined on the basis of the amount of transmission attenuation, the amount of phase change and the thickness measurement results.

The difference between the maximum value and minimum value was determined from the relative dielectric constants of the ten molded articles.

[Overall Evaluation]

Based on the results shown above, an overall evaluation was carried out using criteria 1 to 3 below.

1: a tensile strength of 120 MPa or more, a hydrolysis resistance of 60% or more, an evaluation of A for disk warpage and external appearance, a relative dielectric constant of 3.40 or less, and a difference between maximum and minimum dielectric constant values of 0.07 or less.

2: a tensile strength of 120 MPa or more, a hydrolysis resistance of 50 to 60%, an evaluation of A or B for disk warpage and external appearance, a relative dielectric constant of 3.40 or less, and a difference between maximum and minimum dielectric constant values of 0.05 or less, as measured using ten molded articles.

3: a case where any one of a tensile strength of 120 MPa or more, a hydrolysis resistance of not less than 50% and less than 60%, an evaluation of A or B for disk warpage and external appearance, and a relative dielectric constant of 3.40 or less is not satisfied.

The results of these evaluations are shown in Table 2 below.

TABLE 2

| Component | Code | Example 1 | Example 2 | Example 3 | Comp. Example 1 |
|---|---|---|---|---|---|
| PBT | A | 100 | 100 | 100 | 100 |
| HIPS | B1 | 51.2 | 51.2 | 51.2 | |
| St-MA | C | 17.1 | 17.1 | 17.1 | |
| Epoxy | D | 0.5 | 0.5 | 0.5 | 0.5 |
| GF | E1 | 74.3 | 74.3 | | 44.6 |
| | E2 | | | 74.3 | |
| Stabilizer | G1 | 0.7 | 0.7 | 0.7 | 0.7 |
| Mold-release agent | H | 1.2 | 1.2 | 1.2 | 1.2 |
| CB-MB | J | 2.5 | 2.5 | 2.5 | 2.5 |
| GF kneading temperature | | 278 | 186 | 278 | 278 |
| Tensile strength (MPa) | | 126 | 125 | 120 | 145 |
| Tensile modulus of elasticity (MPa) | | 9400 | 9200 | 9400 | 9700 |
| Hydrolysis resistance (Strength retention rate: %) | | 63 | 65 | 51 | 60 |
| Low warping properties | | B | A | A | C |
| Surface appearance | | B | A | A | B |

TABLE 2-continued

| Component | Code | | Example 1 | Example 2 | Example 3 | Comp. Example 1 |
|---|---|---|---|---|---|---|
| Relative dielectric constant | Average value | | 3.34 | 3.33 | 3.32 | 3.55 |
| | Difference between maximum and minimum values | | 0.06 | 0.02 | 0.05 | 0.03 |
| | Dielectric loss tangent | | 0.011 | 0.011 | 0.011 | 0.012 |
| | Overall evaluation | | 2 | 1 | 2 | 3 |

Examples 4 to 7 and Comparative Example 2

TABLE 3

| Component | Code | |
|---|---|---|
| (A) PBT resin | A | Novaduran 5003 produced by Mitsubishi Engineering-Plastics Corporation<br>Intrinsic viscosity: 0.85 dl/g<br>Terminal carboxyl group content: 12 eq/ton |
| (B1) HIPS | B1 | MT478 produced by PS Japan<br>MFR (200° C./5 kg load): 3.0 g/10 min |
| (B2) PC resin | B2 | Bisphenol A type polycarbonate resin<br>H-4000 produced by Mitsubishi Engineering-Plastics Corporation<br>Mv 250,000 |
| (D) Epoxy compound | D | EP17 produced by ADEKA<br>Bisphenol A type epoxy resin<br>Epoxy equivalent weight: approximately 185 g/eq |
| (E) Glass fibers | E | T-127 produced by Nippon Electric Glass Co., Ltd.<br>Chopped strand glass fibers with average fiber diameter of 13 μm<br>Treated with novolac type epoxy resin |
| (F) Laser light-transmitting dye | F | Mixture of Solvent Blue 104, Solvent Red 179 and Solvent Yellow 163 at mass ratio of 1:1:1 |
| Stabilizer | G1 | Pentaerythritol tetrakis[3-(3,5-di-tert-butyl-4-hydroxyphenyl)propionate]<br>Inganox 1010 produced by BASF |
| | G2 | Phosphate-based stabilizer (C)<br>Approximately equimolar mixture of mono- and di-stearyl acid phosphate-represented by $O=P(OH)_m(OC_{18}H_{37})_{3-m}$ (m = 1,2)<br>"Adekastab AX-71" produced by ADEKA |
| Mold-release agent | H | Pentaerythritol distearate<br>Unistar H-476D produced by NOF Corp., melting point: 53° C. |

Pellets of a thermoplastic resin composition were obtained by homogeneously mixing components other than glass fiber shown in Table 3 above at proportions (parts by mass) shown in Table 4 below using a tumbler mixer, feeding the obtained mixture from the main feed port of a twin screw kneading extruder (TEX30α produced by Japan Steel Works, L/D=42), setting the barrel temperature of a first kneading part to be 270° C., plasticizing, feeding glass fiber at the proportion shown in Table 4 from a side feeder, setting the barrel temperature to be 220° C. following addition of the glass fiber, melt kneading at a discharge rate of 40 kg/h and a screw rotation speed of 200 rpm, extruding the obtained kneaded product, rapidly cooling in a water bath and then forming pellets using a pelletizer, and these pellets were evaluated in the same way as in Example 1, and also subjected to the following evaluations.

[Transmittance (%)]

A plate measuring 60 mm×60 mm×1.5 mm thick was produced by drying the thus obtained resin composition pellets for 5 hours at 120° C. and then molding the pellets using an injection molding machine (NEX80-9E by Nissei Plastic Industrial Co.) at a cylinder temperature of 260° C. and a mold temperature of 80° C.

Transmittance (units: %) of light having a wavelength of 1,070 nm was determined using an ultraviolet-visible-near infrared spectrophotometer (UV-3100PC by Shimadzu Corporation).

[Laser Weld Strength (Units: N)]

Figure 1:
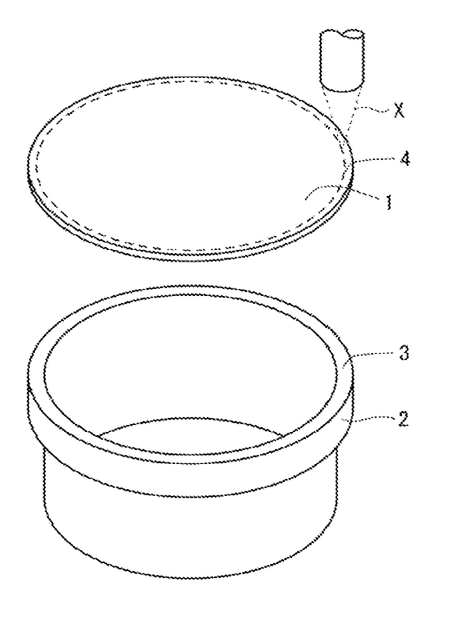
FIG. 1 is an external view of a laser welded article used for measuring laser welding properties in examples and comparative examples.

Laser weld strength measurements were carried out by preparing a disk-shaped transmission-side member 1 and a cylindrical absorption-side member 2 shown in FIG. 1, overlaying the two members, laser welding so as to obtain a laser welded member, and then measuring the weld strength thereof.

(1) Preparation of Test Piece for Transmission-Side Member

After drying pellets obtained in the examples and comparative examples mentioned above for 5 hours at 120° C., a disk-shaped test piece for a transmission-side member (having a diameter of 48 mm and a thickness of 1.5 mm), as shown by the transmission-side member 1 in FIG. 1, was injection molded using an injection molding machine (J55 by Japan Steel Works) at a cylinder temperature of 260° C., a mold temperature of 60° C., an injection speed of 60 mm/s, a holding pressure of 70 MPa, a holding time of 5 s and a cooling time of 15 s.

(2) Preparation of Test Piece for Absorption-Side Member

Pellets for an absorption-side member were produced in the same way as in the production method described above by mixing 100 parts by mass of a polybutylene terephthalate resin (the Novaduran 5008 mentioned above), 1.5 parts by mass of a cresol novolac type epoxy compound (the YDCN704 mentioned above), 0.3 parts by mass of a stabilizer (AO-60 produced by ADEKA), 0.7 parts by mass of a mold-release agent (Unistar H476D produced by NOF Corp.), 2 parts by mass of a carbon black master batch as a coloring agent and 44 parts by mass of a reinforcing filler (the T-127 mentioned above). Using the obtained pellets for an absorption-side member, a cylindrical test piece for an absorption-side member (having a diameter of 48 mm and a height of 20 mm, and having a protruding part having a height of 2 mm and a width of 2 mm relative to the overall width (5 mm) of a joining face 3), as shown by the absorption-side member 2 in FIG. 1, was injection molded under the same molding conditions as those described in section (1) above.

(3) Laser Welding Properties

For laser welding, welded members were produced by overlaying the test piece for a transmission-side member 1 and the test piece for an absorption-side member 2 at a pressing force of 2.5 N/mm$^2$ per unit area, scanning a laser beam X on a planned laser line 4 on the test piece for a transmission-side member 1 using a galvano scanner type laser apparatus (laser wavelength: 1,070 nm, laser spot diameter φ: 2.0 mm) by Fine Device Co., at an output of 150 W and a speed of 900 mm/s, and altering the number of scan circuits.

The obtained welded member was then evaluated using a tensile strength tester (1t Tensilon by Orientec Co., Ltd.) by attaching a pulling rod to a testing tool that had been inserted into the welded article prior to welding, and pulling at a speed of 5 mm/min from the transmission-side member 8 side, and the number of scan circuits until a weld strength of 800 N was achieved was determined and evaluated as the laser welding properties.

A: weld strength of 800 N achieved with 10 scan circuits or fewer
B: weld strength of 800 N achieved with 11 to 15 scan circuits
C: weld strength of 800 N not achieved with 15 scan circuits

[Overall Evaluation]

Based on the results shown above, an overall evaluation was carried out using criteria 1 to 3 below.

1: a tensile strength of 120 MPa or more, a hydrolysis resistance of 60% or more, an evaluation of A for both low warping properties and surface appearance, a relative dielectric constant of 3.40 or less, and a weld strength of 800 N achieved with 10 scan circuits or fewer.

2: a tensile strength of 120 MPa or more, a hydrolysis resistance of 60% or more, an A or B evaluation for low warping properties and surface appearance, a relative dielectric constant of 3.40 to 3.60, and a weld strength of 800 N achieved with 11 to 15 scan circuits.

3: a case where at least two of any of a tensile strength of 120 MPa or less, a hydrolysis resistance of less than 50%, an evaluation of C for low warping properties or surface appearance, a relative dielectric constant of 3.40 or more, and a weld strength of 800 N achieved with 15 scan circuits or more occurs.

However, tensile strength and hydrolysis resistance tended to deteriorate in cases where the added quantity of glass fiber was reduced, but if the dielectric constant, appearance and weld strength are good as a result of product design and usage environment, use is possible.

The results of these evaluations are shown in Table 4 below.

TABLE 4

| Component | Code | Example 4 | Example 5 | Example 6 | Example 7 | Comp. Example 2 |
|---|---|---|---|---|---|---|
| PBT | A | 100 | 100 | 100 | 100 | 100 |
| HIPS | B1 | 50.0 | | | 50 | |
| RD | B2 | 16.7 | 25.0 | 66.7 | 16.7 | |
| Epoxy | D | 2.5 | 1.9 | 2.5 | 2 | 1.5 |
| GF | E | 75.1 | 56.3 | 75.1 | 29.7 | 45 |
| Laser light-transmitting dye | F | 1.0 | 0.8 | 1.0 | 1.0 | 0.6 |
| Stabilizer | G1 | 0.8 | 0.6 | 0.8 | 0.6 | 0.4 |
|  | G2 | 0.3 | 0.2 | 0.3 | 0.2 | |
| Mold-release agent | H | 1.3 | 0.9 | 1.3 | 0.6 | 0.7 |
| CB-MB | J | | | | | |
| Tensile strength (MPa) | | 124 | 142 | 144 | 90 | 138 |
| Tensile modulus of elasticity (MPa) | | 9800 | 10900 | 11200 | 5500 | 10200 |
| Hydrolysis resistance (Strength retention rate: %) | | 60 | 63 | 60 | 50 | 74 |
| Transmittance (%) | | 42 | 64 | 70 | 45 | 28 |
| Low warping properties | | A | B | A | A | C |
| Surface appearance | | A | A | B | A | A |
| Relative dielectric constant at 76.5 GHz | | 3.29 | 3.50 | 3.45 | 3.00 | 3.58 |
| Dielectric loss tangent at 76.5 GHz | | 0.010 | 0.011 | 0.012 | 0.09 | 0.012 |
| No. of scan circuits to achieve weld strength of 800 N | | A | A | A | A | B |
| Overall evaluation | | 1 | 2 | 2 | 3 | 3 |

INDUSTRIAL APPLICABILITY

The thermoplastic resin composition of the present invention has a low relative dielectric constant, gives molded articles which have little variation in terms of relative dielectric constant, achieve an excellent balance between low relative dielectric constant, exhibit low warpage and external appearance, exhibit excellent strength and rigidity, have high transmittance and exhibit excellent laser welding properties, and can therefore be advantageously used as a millimeter-wave radar member.

The invention claimed is:

1. A millimeter-wave radar article, comprising:
   a first molded body, configured as an absorption-side member, comprising carbon black in a range of from 0.2 to 1 mass %; and
   a second molded body, configured as a transmission-side member, comprising a thermoplastic resin composition,
   wherein the thermoplastic resin composition comprises, relative to 100 parts by mass of a polybutylene terephthalate resin (A):
      the polybutylene terephthalate resin (A);
      a rubber-reinforced polystyrene resin (B1) in a range of from 15 to 65 parts by mass and/or a polycarbonate resin (B2) in a range of from 10 to 70 parts by mass, as component (B);
      an epoxy compound (D) in a range of from 0.1 to 3 parts by mass; and
      a glass fiber (E) in a range of from 30 to 150 parts by mass, and
   wherein the first molded piece is laser welded to the second molded piece by laser welding by irradiating laser light upon the carbon black and the thermoplastic resin composition so as to weld and integrate the first and second molded bodies.

2. The article of claim 1, wherein the thermoplastic resin composition further comprises, relative to 100 parts by mass of the polybutylene terephthalate resin (A)
   a styrene-maleic anhydride copolymer (C) in a range of from 10 to 60 parts by mass, wherein the component (B) is the rubber-reinforced polystyrene resin (B1).

3. The article of claim 1, wherein the thermoplastic resin composition comprises, relative to 100 parts by mass of the polybutylene terephthalate resin (A)
   the rubber-reinforced polystyrene resin (B1) in a range of from 15 to 65 parts by mass; and
   the polycarbonate resin (B2) in a range of from 10 to 60 parts by mass.

4. The article of claim 1, wherein the thermoplastic resin composition comprises, relative to 100 parts by mass of the polybutylene terephthalate resin (A)
   the polycarbonate resin (B2) in a range of from 10 to 70 parts by mass.

5. The article of claim 1, wherein the thermoplastic resin composition further comprises, relative to 100 parts by mass of the polybutylene terephthalate resin (A)
   a laser light-transmitting dye (F) in a range of from 0.0005 to 0.5 parts by mass.

6. The article of claim 1, wherein the thermoplastic resin composition comprises, relative to 100 parts by mass of the polybutylene terephthalate resin (A)
   no more than 0.1 parts by mass of carbon black.

7. The article of claim 1, wherein the thermoplastic resin composition comprises no carbon black.

8. The article of claim 1, comprising a novolac epoxy compound, configured as a sizing agent or a surface treatment agent for the glass fiber (E).

9. The article of claim 1, having a relative dielectric constant of 3.50 or less.

10. The article of claim 1, wherein a difference between maximum and minimum relative dielectric constant values of at least 10 millimeter-wave radar members is 0.07 or less.

11. The article of claim 1, wherein the second molded body further comprises nigrosine, aniline black, phthalocyanine, naphthalocyanine, porphyrin, perylene, quaterrylene, azo dye, anthraquinone, squaric acid derivative, and/or immonium compound.

12. The article of claim 1, wherein the first molded body is a millimeter-wave radar antenna housing, and
   wherein the second molded body is a millimeter-wave radar antenna cover.

13. A millimeter-wave radar, comprising:
   the millimeter-wave radar article of claim 1, the first molded body being an antenna cover and the second molded body being a housing;
   an antenna module configured for transmitting and/or receiving millimeter-wave electromagnetic waves; and
   a member disposed in a pathway between the millimeter-wave radar module and an object to be detected.

14. The article of claim 1, wherein the first molded body is a cylindrical absorption-side member, and
   wherein the second molded body is a disk-shaped transmission-side member.

15. The article of claim 1, wherein the thermoplastic resin composition comprises the epoxy compound (D) in a range of from more than 1.5 to 3 parts by mass, relative to 100 parts by mass of a polybutylene terephthalate resin (A).

16. The article of claim 1, wherein the thermoplastic resin composition comprises the epoxy compound (D) in a range of from 1.9 to 3 parts by mass, relative to 100 parts by mass of a polybutylene terephthalate resin (A).

17. A plurality of at least 10 molded articles, each comprising the millimeter-wave radar article of claim 1,
   wherein a difference between maximum and minimum relative dielectric constant values of the at least 10 molded articles is 0.07 or less.

18. The article of claim 1, wherein the thermoplastic resin composition comprises no acrylate.

19. The article of claim 1, having a relative dielectric constant, at a frequency of 70 to 90 GHz, of 3.50 or less.

20. The article of claim 1, having a dielectric loss tangent, at a frequency of 70 to 90 GHz, of 0.013 or less.

* * * * *